July 4, 1967  J. A. FLORKOWSKI  3,329,270
INTERCONNECTED DUAL ELEMENT FILTER ASSEMBLY
Filed July 12, 1965  2 Sheets-Sheet 2
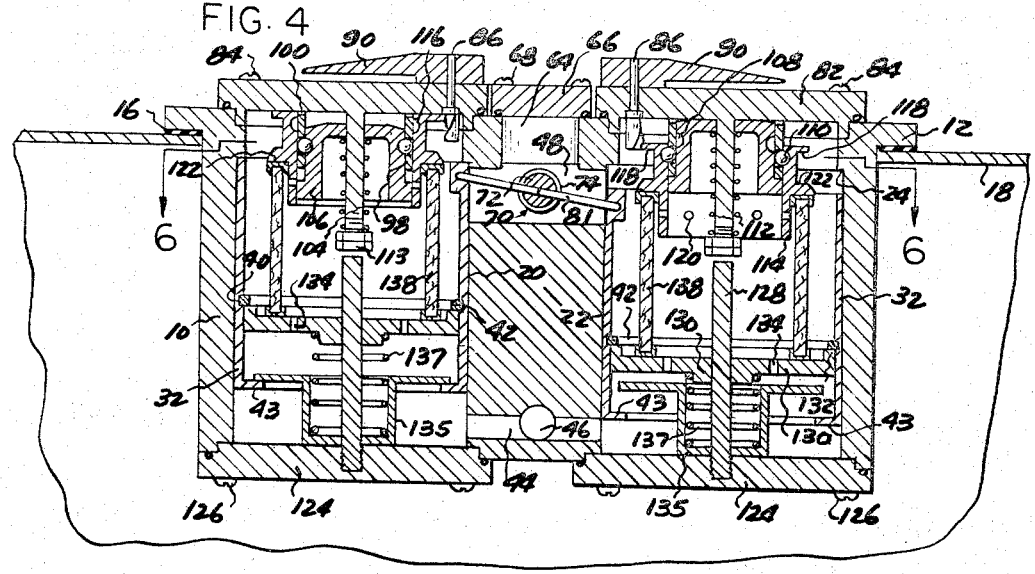
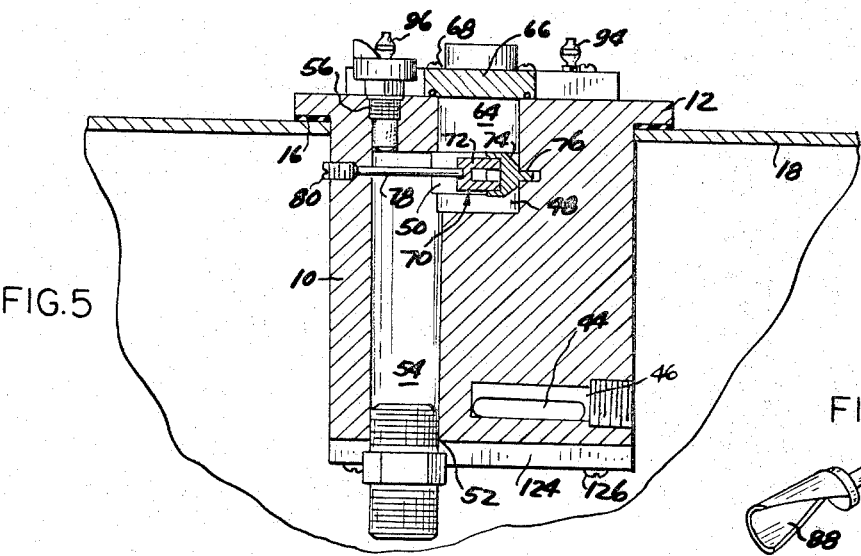
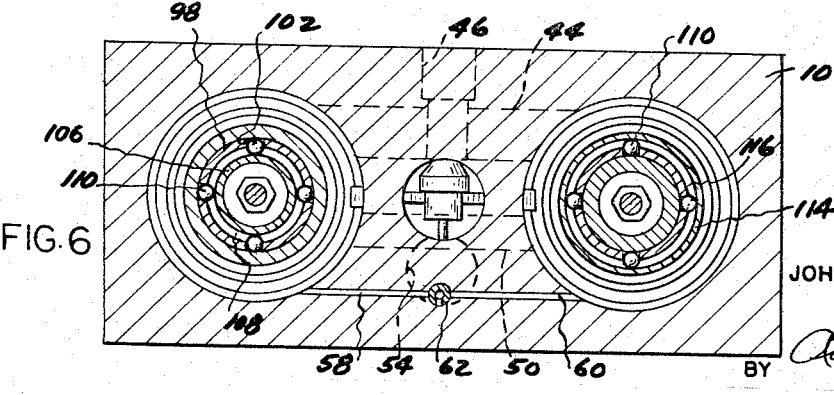
INVENTOR
JOHN ANTHONY
FLORKOWSKI
BY Adolph G. Martin
ATTORNEY

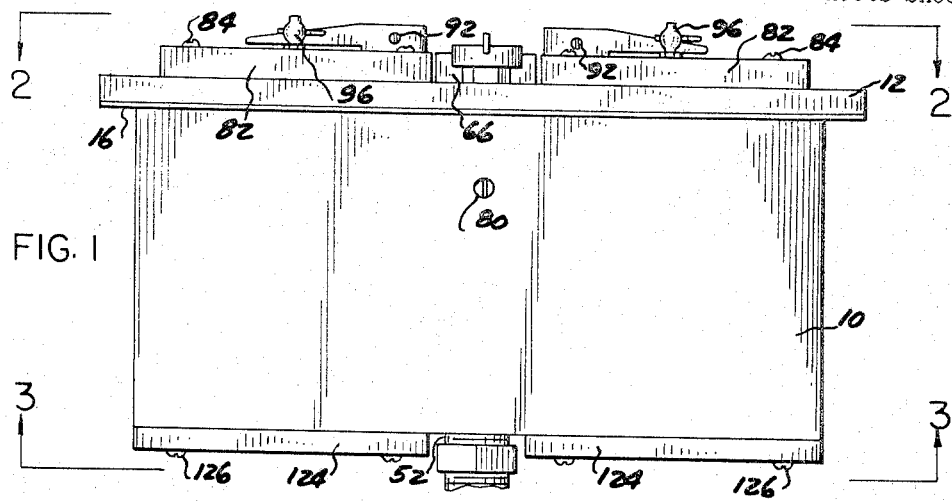
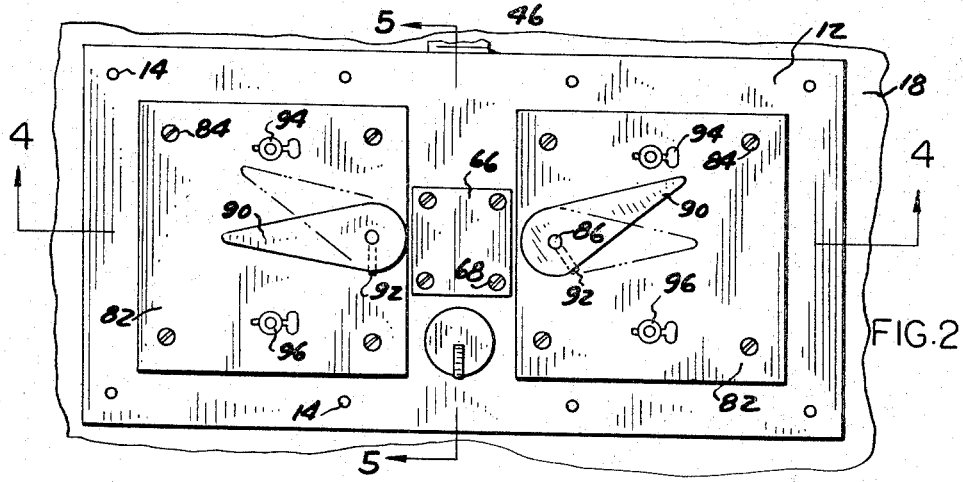
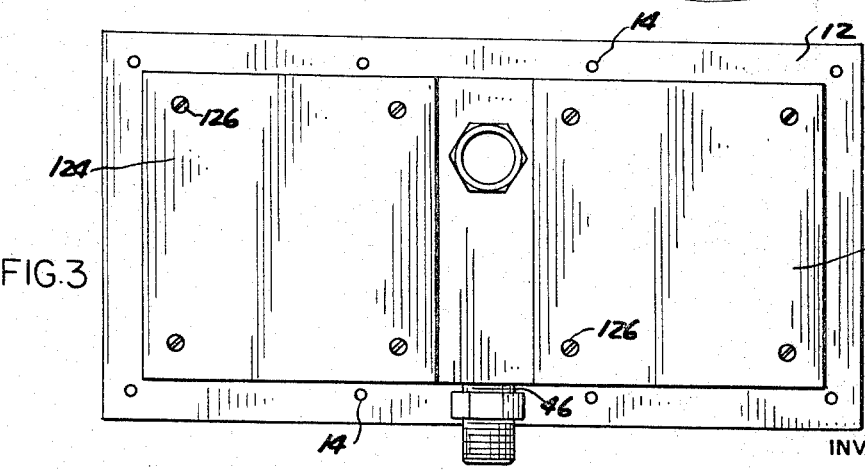

United States Patent Office 3,329,270
Patented July 4, 1967

3,329,270
INTERCONNECTED DUAL ELEMENT FILTER
ASSEMBLY
John Anthony Florkowski, 8207 Schaefer Road,
Detroit, Mich. 48228
Filed July 12, 1965, Ser. No. 471,381
4 Claims. (Cl. 210—132)

ABSTRACT OF THE DISCLOSURE

A liquid filtering device having a pair of chambers each containing a filter element and a shut-off valve which closes automatically when the filter element becomes partially clogged thereby producing a pressure differential between the intake and discharge in excess of a pre-selected magnitude. An interlock between the two shut-off valves places the chambers in operation alternately so that a partially clogged filter element may be cleaned without the necessity of interrupting fluid flow through the device.

This invention relates to liquid filters generally, and more particularly to a dual type liquid filter automatically responisve to pre-selected pressure differentials.

Liquid filters of the type commonly in use on industrial hydraulic systems do not make adequate provision for continuity of service while the filter element is being changed or cleaned. Most filters further fail to provide sufficient safeguards to maintain adequate working pressures in the system when flow through the filters becomes constricted due to accumulations of foreign materials on the filter cartridges.

Cognizant of these deficiencies in filters presently employed, the applicant has, as the primary object of his invention, the provision of a dual type liquid filter which automatically introduces a clean filter cartridge into the hydraulic circuit when the pressure differential across the working filter cartridge reaches a pre-selected magnitude.

Another object of the invention is to provide a filter of the type previously described, that has a visual indicator showing which filter cartridge is in use, thereby expediting the servicing and maintenance of the unit.

A further object of the invention is to provide a liquid filter of the type previously described in which the filter cartridge may be easily and speedily removed without interrupting the hydraulic circuit or system in which the unit is operating.

Yet another object of the invention is to provide a liquid filter of the type previously described which is extremely compact, and relatively inexpensive to produce.

A still further object of the invention is to provide a liquid filter of the type previously described which is very simple and rugged in construction so as to require no appreciable amount of repair and maintenance.

Still another object of the invention is to provide a liquid filter of the type previously described, which is mountable outside the hydraulic tank so as to permit ready access to the unit for inspection and service.

Other features and advantages of the invention will become apparent after consideration of a detailed discussion of the same composed with reference to the drawings constituting a portion of this application, and in which:

FIGURE 1 is a side elevation view of the applicant's dual liquid filter, showing its characteristic shape.

FIGURE 2 is a top plan view, taken substantially on plane 2—2 in FIGURE 1, showing the removable cover plates and the visual indicators.

FIGURE 3 is a bottom view, taken substantially on plane 3—3 in FIGURE 1, showing the removable cover plates and the intake and discharge connectors.

FIGURE 4 is a section view, taken substantially on plane 4—4 in FIGURE 2, showing internal construction of the filter.

FIGURE 5 is a section view, taken substantially on plane 5—5 in FIGURE 2, showing the pivotal interlock between the two control sleeve pistons.

FIGURE 6 is a section view taken substantially on plane 6—6 in FIGURE 4, showing communication between the two small lateral ducts and the selector valve.

FIGURE 7 is an enlarged perspective view of the actuator rod for the visual indicators on the applicant's filter.

For a more detailed description of the invention, reference is made to the drawings in which numeral 10 designates a housing having a mounting flange 12 with a series of spaced openings 14 therein for the reception of fastening bolts or screws, not here shown. A sealing gasket 16 is applied to the lower side of the mounting flange 12 to prevent leakage when the filter is mounted in a hydraulic tank 18 in the manner illustrated by FIGURES 4 and 5.

The housing 10 has a pair of parallel cylinders 20 and 22 therein, each containing an annular seat 24 adjacent the upper end. A sleeve piston 32 in each of the cylinders 20 and 22, has on the inner periphery a circular groove 40, containing a resilient retainer ring 42. An inwardly disposed annular collar 43 is provided on the lower end of each sleeve piston 32. A flat transverse duct 44, in the lower portion of the housing 10 connects the two cylinders 20 and 22 and communicates with a discharge port 46.

A central cavity 48, in the upper side of the housing 10, communicates with both cylinders 20 and 22 through a large duct 50, and connects to an intake port 52 through a vertically disposed duct 54. A threaded opening 56 in the upper face of the housing 10, communicates directly with the central cavity 48, and with each of the cylinders 20 and 22 through two small lateral ducts 58 and 60. A selector valve 62 is engaged in the threaded opening 56 of the housing 10.

A circular opening 64, in the upper side of the housing 10 provides access to the central cavity 48. A self-sealing cover plate 66 over the circular access opening 64 is removably attached to the housing 10 by means of screws 68. A coupling 70 in the central cavity 48, consists of a slotted plug 72 seated in a cup 74 pivotally supported in the housing 10 by means of a central pintle 76. A pivot rod 78, seated in the slotted plug 72, is removably held in position by a retainer screw 80 threaded in the housing 10.

A pair of trip rods 81, held in abutting alignment by the coupling 70, are engaged in the sleeve pistons 32 adjacent the upper edge. Self-sealing top cover plates 82 over the cylinders 20 and 22, are removably attached to the housing 10 by means of screws 84. An actuator rod 86, having thereon a spiral track 88, is pivotally mounted in each of the top cover plates 82. An indicator 90 is detachably mounted on the upper end of each actuator rod 86 by screws 92.

Vent and drain cocks 94 and 96, respectively, are mounted in each of the cover plates 82 so as to communicate with the cylinders 20 and 22 in the housing 10. A small dependent cylinder 98, on the lower side of each cover plate 82, has therein a series of small ports 100 adjacent the upper edge, and four spaced openings 102 therethrough at the mid-section each having a diameter exceeding its length. A downwardly disposed central member 104 depends from each cover plate 82, and has thereon an inverted cup piston 106, slidably contained in the dependent cylinder 98.

A ball detent 110 is slidably retained in each of the spaced openings 102 of the dependent cylinder 98. A circular groove 108 is provided on the outer periphery of the cup pistons 106 for reception of the ball detents 110. A coil spring 112, adjustably held on each of the central members 104 by nuts 113, yieldably urges the cup pistons to a forward position in the dependent cylinders 98. A sleeve 114 on each of the dependent cylinders 98 has on the inside surface thereof a circular groove 116 for reception of the ball detents 110.

A flange 118, around the upper end of the sleeve 114, is seated in the spiral track 88 of the actuator rod 86. The sleeve 114 has spaced openings 120 around the lower portion, and an outwardly disposed central annular shoulder 122. A self-sealing bottom cover plate 124, over the cylinders 20 and 22, are removably attached to the housing 10 by means of screws 126. An upwardly disposed member 128, threadably engaged in each of the bottom cover plates 124, has slidably mounted thereon a transverse circular plate 130 with an upstanding marginal rim 132 seated against the resilient retainer ring 42.

The transverse circular plates 130 in the sleeve pistons 32 have therethrough a plurality of spaced openings 134. A retainer cup 135, positioned on each of the upwardly disposed members 128 on the bottom cover plates 124, has thereon a lateral flange 136 for sealing engagement on the annular collar 43 of the sleeve pistons 32. A coil spring 137 in each of the retainer cups 135 is seated on the lower side of the associated transverse circular plate 130 yieldably urging the sleeve pistons 32 to an advanced position in the cylinders 20 and 22.

The preceding discussion completes a description of the structural details of the applicant's invention as herein disclosed; however, to insure a more thorough appreciation and understanding of the subject matter herein presented, a brief discussion will be directed to the manner in which the applicant's filter operates in performing its intended function, and making possible the realization of the objectives previously herein set forth.

In use, the applicant's dual filter is mounted in a hydraulic tank, as shown in FIGURE 2, so that it functions with the cylinders 20 and 22 in a substantially horizontal position. The discharge port 46 is then connected to the intake side of the pump in the hydraulic system being serviced by the filter. To function properly, the oil at all times must be maintained at a level above the cylinders 20 and 22 so as to avoid the introduction of air into the system.

When the applicant's dual filter is in the position shown in FIGURE 4, the right cylinder 22 is in the open or operating position. Liquid is accordingly being drawn into the intake port 52, through the vertically disposed duct 54, and into the lateral duct 50. It then flows over the top of the sleeve piston 32, and around the removable filter cartridge 138. The liquid is drawn through the cartridge 138 to remove all foreign materials, and into the spaced openings 134 in the transverse circular plate 130.

It then enters the transverse duct 44 in the housing 10, and flows to the discharge port 46. From here it is drawn into the pump and discharged under pressure to the system for use in operating hydraulic equipment and machinery, after which it is returned to the supply tank 18 for re-filtering. When the filter cartridge 138 has become loaded with impurities, and the free flow of liquid therethrough is impeded, a substantial presusre differential across the filter cartridge is created.

As liquid drawn into the cylinder 22 also flows through the series of small ports 100 in the small dependent cylinder 98, this same pressure differential thus appears across the inner and outer faces of the cup piston 106. Therefore when the pressure differential reaches a pre-selected magnitude, as determined by the adjustment on the tension of coil spring 112, the cup piston is forced rearwardly.

When the circular groove 108 on the cup piston 106 reaches a lateral alignment with the spaced openings 102 in the wall of the small dependent cylinder 98, the ball detents 110 are forced into the circular groove 108 by the continuous upward thrust being applied by the coil spring 137. As the ball detents 110 leave the circular groove 116 in the sleeve 114, the latter is forced upwardly, and assumes the position shown in cylinder 20 of FIGURE 4. In moving to this position, the flange 118 on the sleeve 116 pivots the actuator rod 86 thereby moving the indicator 90 thereon to the closed or broken line position shown in FIGURE 2.

The transverse circular plate 130 in the cylinder 22 likewise moves upwardly, and carries with it the sleeve piston 32, which automatically seals the opening of the lateral duct 44 in the well of the cylinder 22. As the sleeve piston 32 moves upward in the cylinder 22, it elevates the end of the trip rod 81 which causes the coupling 70 to rotate in a counter-clockwise direction thereby lowering the end of the other trip rod 81. The sleeve piston 32 in the cylinder 20 is thus shifted downwardly simultaneously with the elevating of sleeve piston 32 in the cylinder 22.

This downward shift of the sleeve piston 32 in the cylinder 20 compresses the coil spring 137 thereby allowing the sleeve 114 also to move downwardly. When the circular groove 116 on the sleeve 114 reaches a lateral alignment with the spaced openings 102 in the dependent cylinder 98, the upward thrust of coil spring 112 moves the ball detents 110 into the circular groove 116. The cup piston 106 is thus released and moves to the forward position shown in cylinder 22 of FIGURE 4, thus locking the sleeve piston 32 in cylinder 20 in a retracted position.

The opening of the lateral duct 50 in the wall of cylinder 20 is now uncovered, and liquid circulates through the filter in the identical manner described for flow through cylinder 22. As the sleeve 114 is moved downward, the flange 118 thereon rotates the actuator rod 86 thus moving the indicator 90 to the full line or open position shown in FIGURE 2 of the drawings. When flow through cylinder 20 is established, cylinder 22 has been withdrawn from the hydraulic circuit, so that the filter cartridge 138 therein can now be removed and cleaned without interrupting the system.

To accomplish this cleaning operation, the drain and vent cocks 96 and 94 respectively in cylinder 22 are first opened. The liquid trapped in this inactive cylinder 22 then proceeds to drain from cock 96, and is replaced by air entering through vent cock 94. When the cylinder 22 is completely drained, the cover plate 82 is detached, and filter cartridge 138 is either cleaned or replaced as required. The cover plate 82 is then re-attached, and the selector valve 62 shifted to the right. Oil now flows from the tank 18, by the force of gravity, upward through vertical duct 54, into the selector valve 62, and through the lateral duct 60 to cylinder 22.

The drain cock 96 is immediately closed, but vent cock 94 is kept open until oil emerges therefrom, indicating that all the air has been expelled from the cylinder 22. The vent cock 94 is then closed, and selector valve 62 is returned to its closed or neutral position as shown in FIGURES 2 and 6 of the drawings. Cylinder 22 of the filter is again ready for service, and will be automatically shifted into the hydraulic circuit when cylinder 20 is withdrawn in the manner previously explained.

Based upon the foregoing discussion, the applicant is of the opinion that his invention has fulfilled a long-felt need in the field of liquid filters, and that he has accordingly made a valuable contribution to the related art. However, while the invention was described with reference to the structural details of a single embodiment, it will be appreciated by those skilled in the art, that the principles involved are susceptible of numerous other practical adaptations.

Therefore, I claim as new, and desire to secure by Letters Patent:

1. A housing having therein two cylinders each provided with an inlet and an outlet, said housing further having an intake port and a discharge port communicating respectively with the inlets and outlets in the cylinders, a sleeve piston in each of the cylinders having therein an advanced and a retracted position, said sleeve pistons each sealing the inlet to its associated cylinder when in an advanced position and opening the same when in a retracted position, means interlocking the sleeve pistons so that when one is in an advanced position, the other is in a retracted position, a filter in each sleeve piston having an outer face and an inner face communicating respectively with the inlet and outlet of the associated cylinder, means in each cylinder supporting the filter and operatively engaging the sleeve piston therein, spring means in each cylinder yieldably urging the support means and its associated sleeve piston to an advanced position, means in each cylinder for locking the sleeve pistons in a retracted position, and control means in each cylinder for the locking means, said control means being actuated by a pre-selected pressure differential across the faces of the filter so as to release the locking means and allow the spring means to move the retracted sleeve piston to an advanced position in the cylinder, whereupon the interlocking means automatically shifts the other sleeve piston to a retracted position in the cylinder.

2. A housing having therein two cylinders each provided with an inlet and an outlet, said housing further having an intake port and a discharge port communicating respectively with the inlets and outlets in the cylinders, a sleeve piston in each of the cylinders having therein an advanced and a retracted position, said sleeve pistons each sealing the inlet to its associated cylinder when in an advanced position and opening the same when in a retracted position, a plate in each cylinder operatively engaging the sleeve piston therein, spring means in each cylinder yieldably urging the plates and their associated sleeve pistons to an advanced position, means interlocking the sleeve pistons so that when one is in an advanced position the other is in a retracted position, a filter in each sleeve piston supported by the plate having an outer face and an inner face communicating respectively with the inlet and outlet of the associated cylinder, and control means in each cylinder for the sleeve pistons, comprising a small cylinder adjacent one end of each sleeve piston, a slidable sleeve on each small cylinder, operatively connected by the filter and plate to the associated sleeve piston, means for locking the sleeves on the cylinders so as to hold the associated sleeve pistons in a retracted position, a cup piston in each small cylinder controlling the locking means, adjustable resilient means for yieldably holding the cup piston in a forward position, a passageway for transmitting liquid pressure at the inlet of each cylinder to the outer face of the associated cup piston, a passageway for transmitting liquid pressure at the outlet of each cylinder to the inner face of the associated cup piston, so that when the pressure differential across the inner and outer faces of the cup piston when in a forward position reaches a pre-selected magnitude the cup piston is shifted rearwardly thereby releasing the locking means and allowing the spring to move the associated sleeve piston to its advanced position in the cylinder, whereupon the interlocking means automatically shifts the other sleeve piston to a retracted position in the cylinder.

3. A housing having therein two cylinders each provided with an inlet and an outlet, said housing further having an intake port and a discharge port communicating respectively with the inlets and outlets in the cylinders, a sleeve piston in each of the cylinders having therein an advanced and a retracted position, said sleeve pistons each sealing the inlet to its associated cylinder when in advanced position and opening the same when in a retracted position, a plate in each cylinder operatively engaging the sleeve piston therein, spring means in each cylinder yieldably urging the plates and their associated sleeve pistons to an advanced position, means interlocking the sleeve pistons so that when one is in an advanced position, the other is in a retracted position, a filter in each sleeve piston supported by the plate having an outer face and an inner face communicating respectively with the inlet and outlet of the associated cylinder, and control means in each cylinder for the sleeve pistons, comprising a small cylinder adjacent one end of each sleeve piston having therethrough an annular array of spaced openings each with a diameter exceeding its length, a slidable sleeve on each small cylinder having a circular groove on the inner periphery, said slidable sleeve being operatively connected to its associated sleeve piston by the filter and plate, a cup piston in each small cylinder having therearound an external circular groove, adjustable resilient means for yieldably holding the cup piston in a forward position, ball detents in the spaced openings of the small cylinder alternately engageable in the circular grooves in the slidable sleeve and the cup piston, a passageway for transmitting liquid pressure at the inlet of each cylinder to the outer face of the associated cup piston, a passageway for transmitting liquid pressure at the outlet of each cylinder to the inner face of the associated cup piston, so that when the pressure differential across the inner and outer faces of the cup piston when in a forward position reaches a pre-selected magnitude it is shifted rearwardly until the cicular groove therearound is laterally aligned with the spaced openings in the small cylinder whereupon the upward thrust of the spring means transmitted through the plate and filter forces the ball detents from the circular groove in the slidable sleeve into the circular groove on the cup piston thereby allowing the plate to carry the sleeve piston to an advanced position in the cylinder, whereupon the interlocking means automatically shifts the other sleeve piston to a retracted position in the cylinder.

4. A housing having therein two cylinders each provided with an inlet and an outlet, said housing further having an intake port and a discharge port communicating respectively with the inlets and outlets in the cylinders, a sleeve piston in each of the cylinders having therein an advanced and a retracted position, said sleeve pistons each sealing the inlet to its associated cylinder when in an advanced position and opening the same when in a retracted position, a transverse plate in each of the sleeve pistons operatively engaging the sleeve piston therein having therethrough a plurality of openings, spring means in each cylinder yieldably urging the transverse plates and their associated sleeve pistons to an advanced positon, means interlocking the sleeve pistons so that when one is in an advanced position the other is in a retracted position, a filter cartridge in each sleeve piston supported on the transverse plate having an outer face and an inner face communicating respectively with the inlet and outlet of the associated cylinder, valve means associated with each sleeve piston for automatically sealing the lower end when it is in an advanced position, and control means in each cylinder for the sleeve pistons, said control means comprising a small cylinder adjacent one end of each sleeve piston having therethrough an annular array of spaced openings each with a diameter exceeding its length, a slidable sleeve on each small cylinder having a circular groove on the inner periphery, said slidable sleeve being means operatively connected to its associated sleeve piston by the filter and transverse plate, a cup piston in each small cylinder having therearound a circular groove, ball detents in the spaced openings of the small cylinder for alternate engagement in the circular grooves of the slidable sleeve and cup piston, adjustable resilient means yieldably holding the cup piston in a forward position, a passageway for transmitting liquid pressure at the inlet of each cylinder to the outer face of the associated cup piston, a passageway for transmitting liquid pressure at the outlet of each cylinder to the inner face of the associated cup piston, so that when the pressure differential across the inner and outer faces of the cup piston when in a forward position reaches a pre-selected magnitude it is shifted rearwardly until the circular groove therearound is laterally aligned with the spaced openings in the small cylinder whereupon the upward thrust of the spring means transmitted through the transverse plate and filter forces the ball detents from the circular groove in the slidable sleeve into the circular groove on the cup piston thereby allowing the transverse plate to carry the sleeve piston to an advanced position in the cylinder, whereupon the interlocking means automatically shifts the other sleeve piston to a retracted position in the cylinder.

References Cited

UNITED STATES PATENTS

| | | | |
|---|---|---|---|
| 1,171,611 | 2/1916 | Hauer | 210—390 |
| 1,189,566 | 7/1916 | Hauer | 210—340 X |
| 3,077,989 | 2/1963 | Larkin | 210—340 X |

REUBEN FRIEDMAN, *Primary Examiner.*

F. SPEAR, *Assistant Examiner.*